INVENTOR
Anton J. Brence 3,204,933
TIMBER SETTING JACK
Anton Brence, Box 134, Loydell, Pa.
Filed Sept. 12, 1963, Ser. No. 310,189
3 Claims. (Cl. 254—133)

The invention relates to a jacking mechanism and more particularly to an improved highly maneuverable jack mechanism for use in elevating mine timber up against a mine or tunnel roof and for holding the timber in position during setting thereof. In the accompanying drawing there is shown for purpose of illustration one form which the invention may assume in practice.

Figure 1:
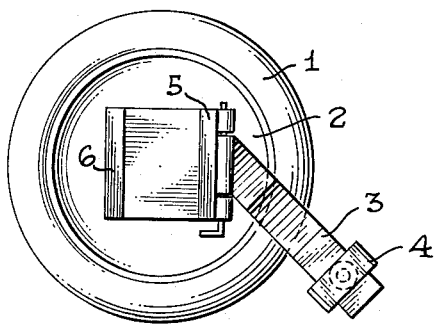
FIG. 1 is a top view of a base and stabilizing means of a timber setting device in which an illustrative form of the improved jack mechanism is embodied.
Figure 3:
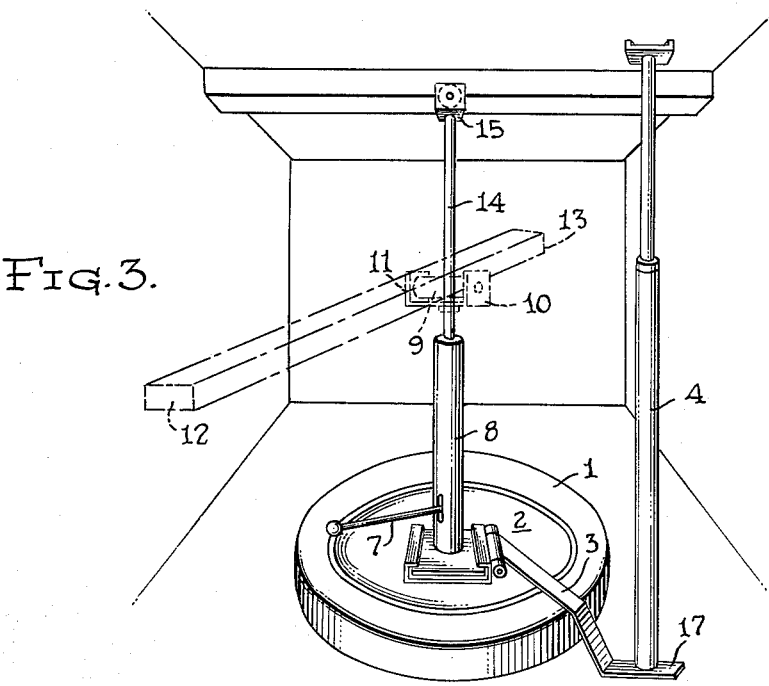
FIG. 3 is perspective view of the entire jacking mechanism in operative position in a mine tunnel.

Referring now more particularly to the drawing, in FIGS. 1 and 3 numeral 1 designates a support base which may be an automobile wheel which comprises a tire and rim arrangement with the tire partially inflated. The rubber tire provides equilibrium and prevents the device from sliding during operation due to the frictional properties of said tire. Attached to the rim 2 is a channel shaped bracket 5, 6 for receiving the base of a manually actuated hydraulic jack 8, 14 which may be of known construction.

Attached to the rim 2 of the wheel adjacent the bracket 5, 6 and extending laterally outwardly therefrom is an elongated flat metal bar 3. Bar 3 is releasably hinged at one end to rim 2 whereby the same may be easily dismantled. The elongated bar 3 extends out over the tire and is bent intermediate the ends thereof to conform to the contour of the tire. The free end 17 of the bar extends beyond the tire and provides a seat for an upstanding stabilizing screw jack 4.

Stabilizing screw jack 4, in shortened condition, is positioned on end 17 of bar 4 and is then extended until the upper end is forced against the roof of the mine. This arrangement further stabilizes the base against tilting during the elevation of a timber 12, 13 by hydraulic jack 8, 14.

Figure 2:
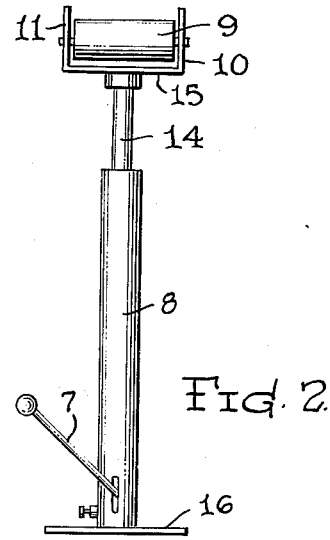
FIG. 2 is a side elevational view of the timber elevating jack in collapsed condition.

The base 16 of hydraulic jack 8, 14 is supported in bracket 5, 6 on the rim 2, as shown in FIG. 3. The hydraulic jack, as illustrated in FIGS. 2 and 3, includes an outer stationary cylinder 8 and a rotatable and reciprocable piston rod 14 within said cylinder 8. Attached to the upper end of piston rod 14 is a U-shaped head including spaced upstanding arms 10 and 11 interconnected by a horizontal portion 15. Located between the arms 10 and 11 and below the upper ends thereof is an anti-friction roller means 9. This arrangement allows a timber to be easily shifted and guided. The portions of the arms 10 and 11 above the roller means 9 also prevents the timber, being positioned, from accidentally falling off the jack head. The jack head is rotatably mounted on a vertical axis relative to the base 1 and cylinder 8 whereby the timber 12, 13 may be manipulated in place during elevating same, as illustrated in FIG. 3.

The jack has a self contained hydraulic pump unit of conventional design and is actuated by handle 7.

In using the invention to set a timber in a mine tunnel, the device is transported in a dismantled condition to the desired location, the device is then assembled by placing base 1 on the mine floor, securing stabilizing bar 3 to rim 2, extending the stabilizing screw jack from free end 17 of said stabilizing bar to the roof of the mine and placing the base of the hydraulic jack in bracket 5, 6. The device is now in position for an operator to position a timber against a mine roof.

The timber is placed in an inclined position on anti-friction roller means 9, pump handle 7 is actuated to thereby elevate said timber until end 13 engages the mine roof. Further actuation of the jack causes end 12 to raise toward the mine roof. When end 12 is a few inches from the mine roof, the timber is manipulated by hand until it is substantially in its desired position, the jack is again actuated until the timber is firmly against the mine roof. The timber is now in position for placing permanent end post thereunder.

Having thus described the invention, what is claimed is:

1. A highly maneuverable, readily transportable and easily assembled jack for manipulating overhead mine timbers or the like comprising:
   (a) a base member for resting on a mine floor;
   (b) a telescopic jack member having upper and lower telescopic members and equipped with manually operable jack operated means;
   (c) means on said base for releasably securing said jack member thereon;
   (d) a head comprising a U-shaped frame portion mounted on said upper telescopic member for rotation about an axis coaxial with respect to said lower telescopic member and anti-friction means disposed between the arms of the U and below the upper free ends thereof whereby a mine timber may be easily shifted on the head and guided by the arms of the U; and
   (e) means associated with said base and mine roof for stabilizing said base, said last mentioned means including a laterally extending member having one end connected to the base and its other end extending beyond said base and means extending between said other end and the mine roof.

2. A device according to claim 1, wherein said base is a wheel having a central rim portion and a pneumatic tire portion for providing equilibrium and to prevent sliding.

3. A device according to claim 1, wherein said anti-friction means is a roller means.

References Cited by the Examiner

UNITED STATES PATENTS

| 131,920 | 10/72 | Westgate | 254—100 |
| 2,596,462 | 5/52 | Ball | 254—93 |
| 2,656,057 | 10/53 | Felderman et al. | 214—75 |

WILLIAM FELDMAN, *Primary Examiner.*

MILTON S. MEHR, *Examiner.*